(12) United States Patent
Whitehouse et al.

(10) Patent No.: US 10,927,817 B1
(45) Date of Patent: Feb. 23, 2021

(54) HYBRID VERTICAL/HORIZONTAL AXIS WIND TURBINE FOR DEEP-WATER OFFSHORE INSTALLATIONS

(71) Applicant: CONTINUUM DYNAMICS, INC., Ewing, NJ (US)

(72) Inventors: Glen R. Whitehouse, Skillman, NJ (US); Alan J. Bilanin, Princeton, NJ (US); Alexander H. Boschitsch, Cranbury, NJ (US); Daniel A. Wachspress, Yardley, PA (US)

(73) Assignee: CONTINUUM DYNAMICS, INC., Ewing, NJ (US)

( * ) Notice: Subject to any disclaimer, the term of this patent is extended or adjusted under 35 U.S.C. 154(b) by 0 days.

(21) Appl. No.: 17/067,692

(22) Filed: Oct. 11, 2020

Related U.S. Application Data (60) Division of application No. 16/820,019, filed on Mar. 16, 2020, now Pat. No. 10,837,426, which is a
(Continued)

(51) Int. Cl.
   *F03D 13/25* (2016.01)
   *F03D 3/00* (2006.01)
   *F03D 3/06* (2006.01)

(52) U.S. Cl.
   CPC ............. *F03D 13/25* (2016.05); *F03D 3/005* (2013.01); *F03D 3/062* (2013.01); *Y02E 10/727* (2013.01); *Y02E 10/74* (2013.01)

(58) Field of Classification Search
   CPC .......... F03D 13/25; F03D 3/062; F03D 3/005; Y02E 10/74; Y02E 10/727
   See application file for complete search history.

(56) References Cited

U.S. PATENT DOCUMENTS

| 1,835,018 A | 12/1931 | Darrieus |
| 4,050,246 A | 9/1977 | Bourquardez |

(Continued)

FOREIGN PATENT DOCUMENTS

| CA | 1151072 | 8/1983 |
| DE | 10 2007 062616 | 6/2009 |

(Continued)

OTHER PUBLICATIONS

"Wind Turbine Projects Run Into Resistance," New York Times, Aug. 26, 2010, http://www.nytimes.com/2010/08/27/business/energy-environment/27radar.html, last visited Sep. 14, 2016.
(Continued)

*Primary Examiner* — David E Sosnowski
*Assistant Examiner* — Wayne A Lambert
(74) *Attorney, Agent, or Firm* — David M. Quinlan, P.C.

(57) ABSTRACT

A wind-driven power generating system with a hybrid wind turbine mounted on a floating platform that heels relative to horizontal in the presence of a prevailing wind. The hybrid turbine has a turbine rotor with at least two rotor blades, each mounted to a turbine shaft by at least one strut, and the system is configured so that the shaft forms a predetermined non-zero operating heel angle relative to vertical in the presence of a prevailing wind at a predetermined velocity. The blades and struts are airfoils with predetermined aerodynamic characteristics that generate lift forces with components in the direction of rotation around the shaft of the blades and struts at the operating heel angle to drive an electrical generator carried by the platform. The system can be designed to generate maximum power at the predetermined heel angle or essentially constant power over a range of heel angles.

21 Claims, 7 Drawing Sheets

Related U.S. Application Data continuation of application No. 16/426,286, filed on May 30, 2019, now Pat. No. 10,598,156, which is a division of application No. 15/259,969, filed on Sep. 8, 2016, now Pat. No. 10,344,742.

(60) Provisional application No. 62/283,662, filed on Sep. 8, 2015.

(56) References Cited

U.S. PATENT DOCUMENTS

| | | | |
|---|---|---|---|
| 4,087,202 | A | 5/1978 | Musgrove |
| 4,105,363 | A | 8/1978 | Loth |
| 4,204,805 | A | 5/1980 | Bolie |
| 4,264,279 | A | 4/1981 | Dereng |
| 4,293,279 | A | 10/1981 | Bolie |
| 4,325,674 | A | 4/1982 | Ljungstrom |
| 4,329,116 | A | 5/1982 | Ljungstrom |
| 4,561,826 | A | 12/1985 | Taylor |
| 4,624,624 | A | 11/1986 | Yum |
| 4,630,996 | A | 12/1986 | Masaki |
| 5,171,127 | A | 12/1992 | Feldman et al. |
| 5,295,793 | A | 3/1994 | Belden |
| 5,375,324 | A | 12/1994 | Wallace et al. |
| 5,405,246 | A | 4/1995 | Goldberg |
| 6,784,566 | B2 | 8/2004 | Thomas |
| 6,974,309 | B2 | 12/2005 | Seki |
| 7,156,037 | B2 | 1/2007 | Borgen |
| 7,397,144 | B1 | 7/2008 | Brostmeyer et al. |
| 7,456,515 | B2 | 11/2008 | Nielsen |
| 7,677,862 | B2 | 3/2010 | Boatner |
| 7,750,492 | B1 | 7/2010 | Ryznic et al. |
| 7,967,569 | B2 | 6/2011 | Yan |
| 7,980,810 | B2 | 7/2011 | Unno |
| 7,988,413 | B2 | 8/2011 | Harr |
| 8,038,383 | B2 | 10/2011 | Shame |
| 8,169,099 | B2 | 5/2012 | Roznitsky et al. |
| 8,272,840 | B2 | 9/2012 | Yan |
| 8,322,989 | B2 | 12/2012 | Ozkul |
| 9,631,503 | B2 | 4/2017 | Ehrnberg |
| 9,702,344 | B2 | 7/2017 | Skaare |
| 10,208,734 | B2 | 2/2019 | Boschitsch et al. |
| 2003/0168864 | A1 | 9/2003 | Heronemous et al. |
| 2006/0269396 | A1 | 11/2006 | Borgen |
| 2007/0269311 | A1 | 11/2007 | Browning |
| 2008/0095608 | A1 | 4/2008 | Boatner |
| 2009/0091136 | A1 | 4/2009 | Viterna |
| 2010/0003134 | A1 | 1/2010 | Edwards et al. |
| 2010/0008733 | A1 | 1/2010 | Stiesdal |
| 2010/0172759 | A1 | 7/2010 | Sullivan |
| 2010/0215492 | A1 | 8/2010 | Domenech Barcons |
| 2011/0042958 | A1 | 2/2011 | Vander Straeten |
| 2011/0133474 | A1 | 6/2011 | Haar |
| 2011/0140420 | A1 | 6/2011 | Loh et al. |
| 2011/0140426 | A1 | 6/2011 | Garcia Lopez et al. |
| 2011/0311360 | A1 | 12/2011 | Nedrebo |
| 2012/0091715 | A1 | 4/2012 | Ozkul |
| 2012/0171034 | A1 | 7/2012 | Gabeiras et al. |
| 2013/0052015 | A1 | 2/2013 | Velund |
| 2014/0147248 | A1 | 5/2014 | Akimoto |
| 2016/0177927 | A1 | 6/2016 | Saeki et al. |

FOREIGN PATENT DOCUMENTS

| | | |
|---|---|---|
| KR | 10 2009 0112469 | 10/2009 |
| MD | 3847 | 2/2009 |
| WO | 2011/021733 | 2/2011 |

OTHER PUBLICATIONS

Paquette, Joshua, et al., "Innovative Offshore Vertical-Axis Wind Turbine Rotor Project," Proc. of European Wind Energy Assoc., Copenhagen, Denmark, Apr. 16-19, 2012.

"Vertiwind: Making Floating Wind Turbine Technology Competitive for Offshore," Nenuphar, S.A., Oct. 2012, http://www.twenties-project.eu/system/files/2_2013-03%20Presentation%20short.pdf, last visited ).

Whitehouse, Glen R., et al., "Variable Geometry Wind Turbine for Performance Enhancement, Improved Stability and Reduced Cost of Energy," Wind Energy, John Wiley & Sons, Ltd. published online at http://onlinelibrary.wiley.com/doi/10.1002/we.1764/full (May 15, 2014).

Ragheb, M., "Vertical Axis Wind Turbines," Mar. 21, 2015, http://mragheb.com/NPRE%20475%20Wind%20Power%20Systems/Vertical%20Axis%20Wind%20Turbines.pdf, last visited Jun. 22, 2016.

"The Nenuphar Solution—Nenuphar Wind," Nenuphar, S.A., 2015, http://www.nenuphar-wind.com/en/15-the-nenuphar-solution.html.

"Nenuphar Presentation," 4eme Convention Internationale des Energies Marines Renouvelables, Nantes, FR, May 20-21, 2015.

HYBRID VERTICAL/HORIZONTAL AXIS WIND TURBINE FOR DEEP-WATER OFFSHORE INSTALLATIONS

CROSS-REFERENCE TO RELATED APPLICATION

This application claims the benefit of U.S. provisional application No. 62/283,662, filed Sep. 8, 2015, the entire contents of which are incorporated herein by reference. This application also claims benefit of prior U.S. application Ser. No. 15/259,969, filed Sep. 8, 2016, now U.S. Pat. No. 10,344,742, issued Jul. 9, 2019, and of prior U.S. application Ser. No. 16/426,286, filed May 30, 2019, now U.S. Pat. No. 10,598,156, issued Mar. 24, 2020. This application includes subject matter related to that disclosed in the applicant's U.S. application Ser. No. 15/138,000, filed Apr. 25, 2016, now U.S. Pat. No. 10,208,734, entitled "Lift-Driven Wind Turbine with Force Canceling Blade Configuration," issued Feb. 19, 2019. The entire contents of U.S. Pat. No. 10,208,734, and provisional application No. 62/178,917, filed Apr. 23, 2015, from which U.S. Pat. No. 10,208,734 claims priority, are also incorporated herein by reference.

BACKGROUND OF THE INVENTION

Field of the Invention

The present invention relates to floating lift-driven wind turbines, and more particularly, to a floating hybrid vertical/horizontal axis wind turbine designed to assume a predetermined heel angle that can be chosen to maximize the electrical power generated by the wind at a specific offshore location with known environmental conditions and to a floating hybrid wind turbine that generates nearly constant power over a range of heel angles.

Description of Related Art

The power industry is increasingly developing ways of generating electricity other than fossil fuels and nuclear energy. Many sources of renewable energy are being considered, but wind is one of the most popular. The number of "wind farms," sometimes comprising hundreds of wind turbines arrayed over a several square miles, is steadily increasing.

However, the only type of wind turbine currently used for large, utility-scale power generation is the horizontal axis wind turbine (HAWT). Vertical axis wind turbines (VAWT) are a known alternative to HAWTs, and the applicant's above-referenced U.S. Pat. No. 10,208,734 discusses at length the advantages, and disadvantages, of heretofore known types of lift-driven VAWTs versus HAWTs.

For a variety of reasons, the industry has focused more on improving HAWT technology than on developing VAWTs. As pointed out in reference U.S. Pat. No. 10,208,734, utility-scale VAWT technology is not as mature as that for HAWTs, with no known VAWT systems currently being offered or produced by existing utility-scale turbine manufacturers. VAWTs produced in the past that were considered utility-scale at the time are too small to be considered as such (by a factor of ten or more) by current standards. But the focus has been shifting to VAWTs for deep-water offshore applications where the turbine will be mounted on a floating platform. One reason is the argument that taking into account factors such as operation and maintenance costs, capital investment, and other expenses involved in generating electricity, VAWTs' total cost of energy (COE) has the potential to be competitive with, or even lower than, COEs for HAWT designs. See, for example, Paquette, Joshua, et al., "Innovative Offshore Vertical-Axis Wind Turbine Rotor Project," Proc. of European Wind Energy Assoc., Copenhagen, Denmark, April 16-19, 2012.

However, to become commercially viable VAWTs will still have to be made at utility-scale sizes without adversely affecting their potential COE advantage. This is because according to principles of physics, the size of a turbine determines the total power $P_W$ it can extract from the wind, expressed by the formula:

$$P_W = \left\{ \left(\frac{1}{2}\right) \rho U^3 A \right\} C_P \tag{1}$$

where $\rho$=density of air, $U$=wind velocity, $A$=projected area of the turbine (as defined further below), and $C_P$ is the power coefficient, which is a measure of turbine efficiency.

As seen by this equation, $P_W$ can be increased by making the turbine larger (increasing the value of A in eq. 1). But increasing the size (projected area A) of the turbine requires not only that the principal turbine parts—blades and struts—be longer, but also that they be made more robust. If all three linear dimensions of the blades and struts must be increased, then the weight and the cost of materials increase as the cube of the size (for example, doubling each linear dimension would increase cost by a factor of eight), which results in an increase in overall COE. The unique wind turbine described in reference U.S. Pat. No. 10,208,734 represents a significant advance toward making larger size VAWT-type turbines commercially viable through a design that lowers the cost-of-material contribution to COE by reducing the loads on the larger turbine structure that would otherwise require more robust blades and struts.

Even as technical advances make it possible to scale up VAWTs, it is anticipated that the present level of resistance to land-based wind farms will continue to increase. National Wind Watch, Inc. (www.wind-watch.org), cites a long list of organizations around the world opposed to the use of wind as a renewable energy resource (see also North American Platform Against Wind Power, www.na-paw.org). While some observers have expressed doubt about the technical efficacy of using wind power in any manner, many of the arguments against it relate either to adverse effects of land-based HAWTs on the environment (unsightly appearance, danger to birds, etc.), or on those living in proximity to them (noise, perceived ambient pressure fluctuations, etc.). The FAA and the U.S. military have also expressed concerns about locating HAWT-based wind farms near aviation sites. "Wind Turbine Projects Run Into Resistance," New York Times, Aug. 26, 2010 ("In 2009, about 9,000 megawatts of proposed wind projects were abandoned or delayed because of radar concerns raised by the military and the Federal Aviation Administration, according to a member survey by the American Wind Energy Association. That is nearly as much as the amount of wind capacity that was actually built in the same year, the trade group says.") (http://www.nytimes.com/2010/08/27/business/energy-environment/27radar.html).

As a result, the interest in developing offshore wind farms of any type, whether they comprise HAWTs or VAWTs, has intensified in recent years. In fact, offshore wind farms have long been a favored approach because oceans, seas, and large lakes have plentiful locations where prevailing winds are more reliably and constantly higher than over land. HAWTs are not particularly suited to deep-water installations for well-known reasons, some of which are discussed in reference U.S. Pat. No. 10,208,734. Most of these reasons are inherent to the HAWT configuration, where the heavy turbine rotor and its associated power generation equipment are located hundreds of feet above the surface and the tower supporting them must remain vertical. Presently, the industry has not determined a practical way around the necessity of locating an HAWT in water shallow enough to secure its supporting platform in the seabed, which means in almost all cases that offshore HAWT wind farms will still be in sight of land, at least for the foreseeable future. To be out of sight of an observer on land, a 200 m tall wind turbine would have to be roughly 35 miles offshore. Most locations in the large bodies of water of the world are too deep to justify the increase in COE resulting from the cost of infrastructure required to secure the HAWT to the underlying seabed.

Another reason for increasing interest in VAWTs is that their configuration makes them much more suitable for floating offshore installation because their low center of gravity makes it easier to stabilize them in the presence of prevailing winds, as discussed in the referenced patent. VAWTs also do not have to be oriented at a specific angle to the oncoming wind-a significant advantage over HAWTs, which require costly equipment for turning them into the wind. The design approach for free-floating installations of VAWTs has heretofore been to seek ways to limit the amount they heel at an angle to vertical in the presence of a prevailing wind. See, for example, Paquette, Joshua, et al., which discusses ways to stabilize floating VAWT platforms. In Europe, Nenuphar, S. A., of Lille, France, has been working since 2006 on bringing floating VAWTs to commercial application. Its approach is to limit the amount by which the VAWT is permitted to heel so that the platform can be made smaller. "Vertiwind: Making Floating Wind Turbine Technology Competitive for Offshore," Nenuphar, S. A., October 2012 (http://www.twenties-project.eu/system/files/2_2013-03%20Presentation %20short.pdf). More recently, Nenuphar has proposed using counter-rotating VAWTs on the same platform, which it claims will reduce heeling moment by at least 40%, and in turn reduce platform cost "The Nenuphar Solution—Nenuphar Wind," Nenuphar, S. A., 2015 (http://www.nenuphar-wind.com/en/15-the-nenuphar-solution.html). While this approach may work once it is tried on an actual installation, the physics of using wind energy to generate electricity will probably drive development toward larger and larger VAWTs to increase their capacity. As VAWTs are made larger, the heeling moment will perforce increase to the point where platform constructions and gearing arrangements for multiple VAWTs on a single platform may result in unacceptable COE increases.

What is needed is a fundamentally new design paradigm that will still enable VAWTs to be scaled up to sizes that can make a meaningful reduction in their COE (per referenced U.S. Pat. No. 10,208,734), and will also allow offshore installation at distances that place them over the horizon, while avoiding complex and expensive arrangements (like counter-rotating VAWTs mounted on the same platform).

SUMMARY OF THE INVENTION

To that end, a principal aspect of the invention involves approaching the design of an offshore VAWT-type turbine by taking advantage of the fact that floating VAWTs will necessarily heel in the presence of prevailing winds, rather than treating heeling as a problem to be overcome. The struts that support the turbine blades of the heeled over VAWT are designed to act as power generating rotors in their own right. This approach uses the increase in total lift in the direction of rotation created by the blades and the struts to construct a hybrid vertical/horizontal axis wind turbine which will assume a predetermined heel angle at a given wind speed.

In another aspect of the invention, the geometry and aerodynamic properties of the blades and struts are designed to generate maximum power at that predetermined heel angle, thus permitting the hybrid turbine to be tailored for installation at a particular offshore site that has known environmental conditions.

In yet another aspect of the invention, the geometry and the aerodynamic properties of the blades and struts are chosen to provide essentially constant power over a range of heel angles.

Underlying this innovative design paradigm is the insight that as the heel angle increases, the torque about the hybrid turbine axis generated by lift on the VAWT blades will decrease, but that the torque generated by lift on the struts can be made to increase. The invention includes a design method for determining the optimum heel angle using the complex interaction between these lift forces for any given turbine geometry with blades and struts having predetermined aerodynamic characteristics and the optimum turbine geometry for achieving that heel angle. By increasing the torque about the shaft for the wind speed conditions at a specific location, a power generating system comprising a hybrid vertical/horizontal axis wind turbine in accordance with the teachings herein can be constructed that will generate more power than conventional VAWTs or HAWTs alone.

Other general and specific aspects, details, embodiments, and adaptations of a VAWT (as defined below) in furtherance of the objects of the subject matter herein are described below in the context of certain specific embodiments of the claimed subject matter.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

In general, terms used throughout have the ordinary and customary meaning that would be ascribed to them by one of ordinary skill in the art. However, some of the terms used in the description herein will be explicitly defined and that definition is meant to apply throughout. For example, the term is "substantially" is sometimes used to indicate a degree of similarity of one property or parameter to another. This means that the properties or parameters are sufficiently similar in value to achieve the purpose ascribed to them in the context of the description accompanying the use of the term. Exact equivalence of many properties or parameters discussed herein is not possible because of factors such as engineering tolerances and normal variations in operating conditions, but such deviations from an exact identity still fall within the meaning herein of being "substantially" the same. Likewise, omission of the term "substantially" when equating two such properties or parameters does not imply that they are identical unless the context suggests otherwise. Similar considerations apply to the term "about," which is sometimes used herein to indicate that the nominal value of a parameter can vary a certain amount as long as it produces the intended effect or result.

Further, when elements are referred to as being "connected" or "coupled," the elements can be directly connected or coupled together or one or more intervening elements may also be present. In contrast, when elements are referred to as being "directly connected" or "directly coupled," there are no intervening elements present.

It will also be understood that the term "VAWT" is not limited to a wind turbine with a vertically oriented shaft axis when in operation. As in reference U.S. Pat. No. 10,208,734, the term is meant to describe a lift-driven wind turbine that has blades spaced radially from the shaft with a least a portion of each blade along the length thereof comprising an airfoil for generating on the blade a lift force having a component tangential to the direction of rotation with a magnitude on the blade capable of rotating the shaft in the presence of a prevailing wind. In addition, it should be understood that the term "heel angle" refers to the mean value of the heel angle of the axis of the hybrid turbine described herein considered over a predetermined period of time, since in floating operation the heel angle β may fluctuate due to environmental conditions such as waves and/or varying wind speed, as well as the unsteady dynamics of the wind turbine itself.

I. VAWT Geometry for Illustrating Principles Underlying the Invention

Figure 1:
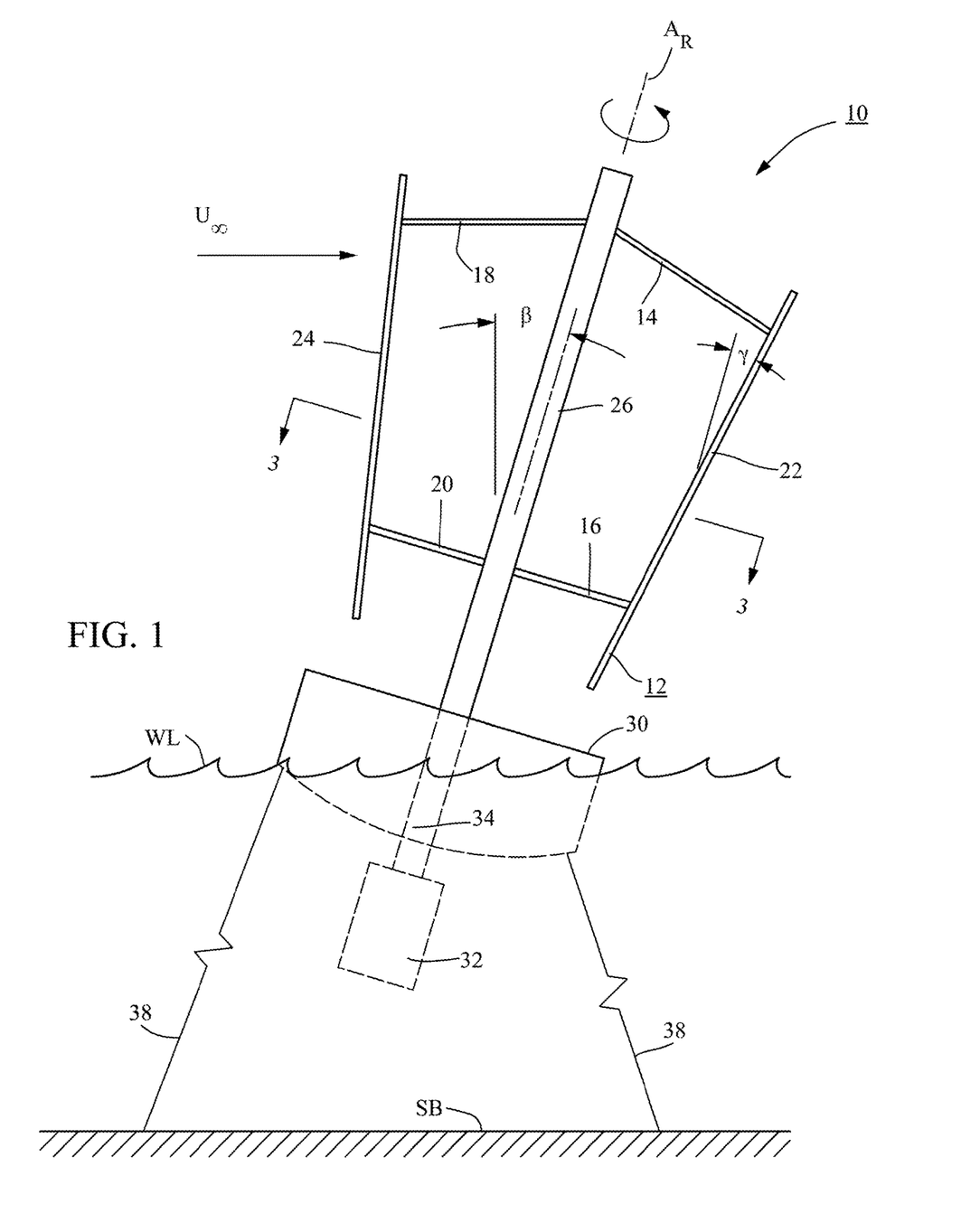
FIG. 1 is a schematic depiction of an embodiment of a power generating system with a floating platform mounting a hybrid vertical/horizontal axis wind turbine adapted from the tilted rotor VAWT in referenced U.S. Pat. No. 10,208,734.

FIG. 1 is a schematic depiction of an embodiment of a power generating system, based on a hybrid vertical/horizontal axis wind turbine 10, for deep-water offshore installations. FIG. 1 is adapted from the depiction in FIG. 4 of U.S. Pat. No. 10,208,734 of a VAWT to which certain design principles of the present invention are applicable. The hybrid turbine 10 includes a rotor 12 that comprises struts 14, 16, 18, and 20, and two blades 22 and 24 mounted by the struts to a tower assembly 26. The blades are designed to cause rotation of a shaft carried by the tower assembly about an axis $A_R$ in the fashion of a lift-driven VAWT as known by those skilled in the art and described in the applicant's referenced U.S. Pat. No. 10,208,734. The direction of rotation of the rotor is denoted by the arrow drawn around the axis in FIG. 1. This figure illustrates a two-blade rotor, with the blades 22 and 24 mounted 180° apart, but the invention contemplates rotors with more blades, which will preferably be equally spaced circumferentially around the tower.

The hybrid turbine 10 is mounted to an anchored floating support platform 30. In this embodiment the platform includes a compartment 32 submerged below the water level WL where it houses a conventional electrical generator and associated machinery. The platform is illustrated in highly schematic form, and in reality will include sufficient superstructure to support the presence of necessary service personnel. The rotating shaft is operatively connected to the generator through a protective casing 34, which can be made large enough to permit service personnel to descend to the submerged compartment for repairs and maintenance. Although the generator and associated machinery can be on the platform, the arrangement shown permits the heavy generating equipment to act as ballast for purposes described further below. The platform 30 is moored by cables 38 anchored in the seabed SB to maintain the turbine 10 at a desired location, but is otherwise free to float to permit the shaft 26 to assume a heel angle β relative to vertical in the presence of a prevailing wind $U_\infty$, which in FIG. 1 is from the left in the plane of the drawing.

The hybrid turbine 10 also incorporates the VAWT force-cancelling geometry and construction disclosed in reference U.S. Pat. No. 10,208,734, with the blades 22 and 24 tilted outwardly at an angle γ relative to the shaft and with a geometric angle of attack ac selected as described in that application. Although the present invention is advantageously applied to a VAWT with the force-canceling characteristics described in the referenced application, it can be applied with equal effect to VAWTs (as defined herein) of different constructions.

Figure 1A:
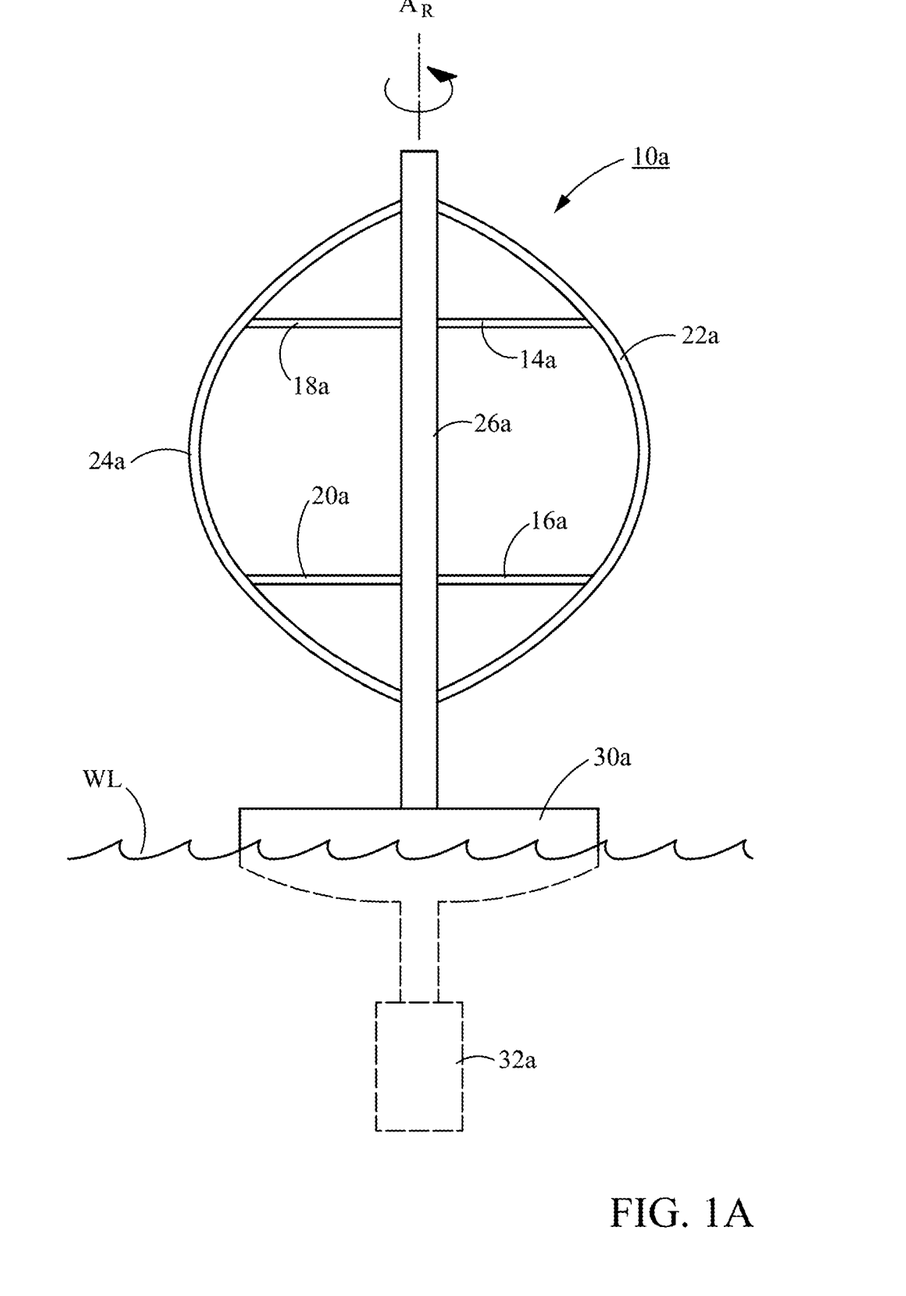
FIG. 1A is a schematic depiction of an alternate embodiment of a VAWT as shown in FIG. 1(e) of referenced U.S. provisional application No. 62/283,662, mounted on a floating platform in the manner shown in FIG. 1.
Figures 2, 10:
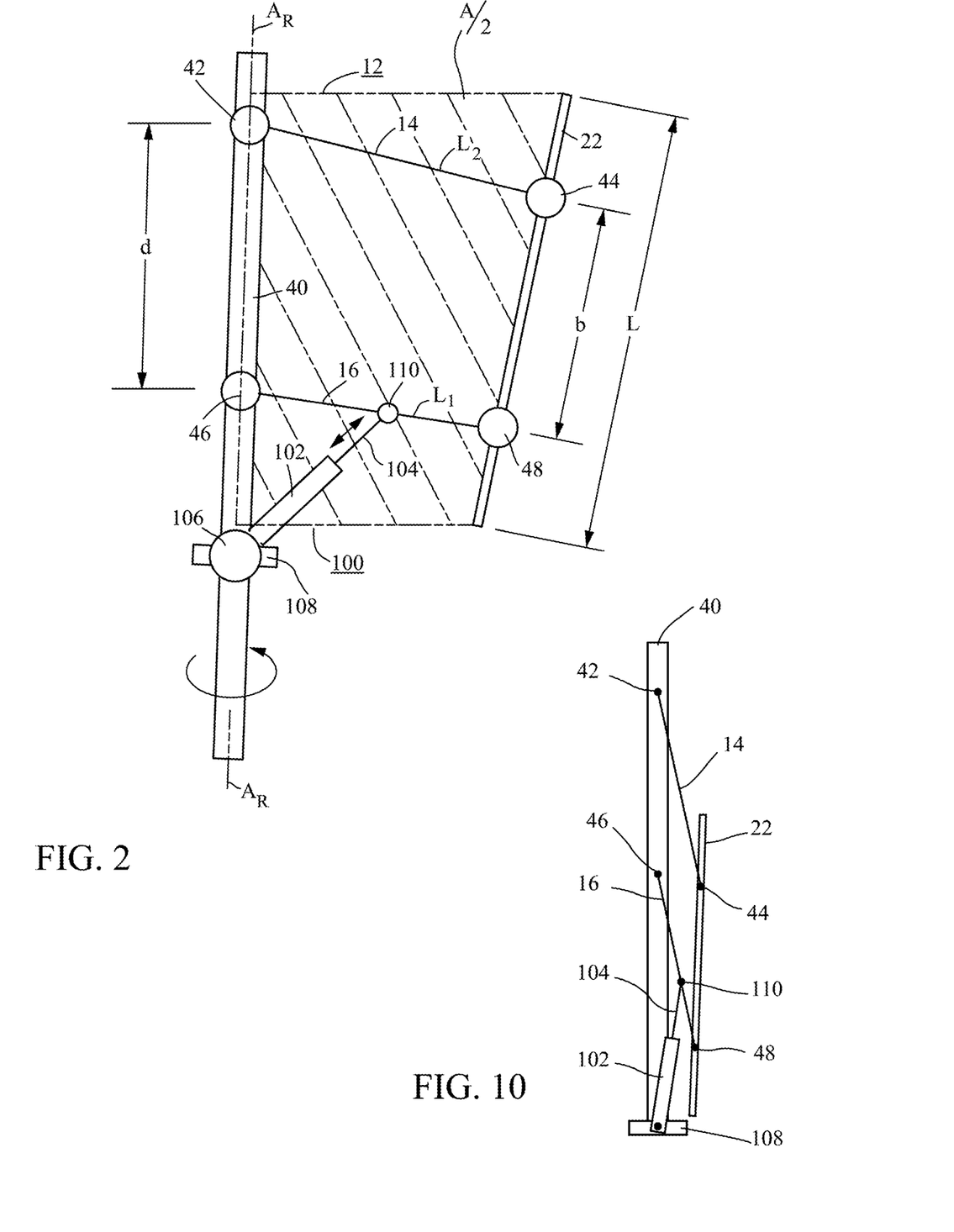
FIG. 2 is a schematic depiction of the operable geometry of an embodiment of the hybrid wind turbine shown in FIG. 1.
FIG. 10 is a schematic depiction of the hybrid turbine shown in FIGS. 1 and 2 in a stowed configuration.

FIG. 2, which is taken from FIG. 7 of the referenced application, illustrates certain dimensional features important to the application of the design approach described herein. For ease of description, the turbine is shown in a vertical orientation rather than at a non-zero heel angle β at which it would operate, and only one strut/blade assembly is shown for ease of description. The upper struts 14 and 18 are hinged at their ends to upper positions of the rotor shaft and the respective blades 22 and 24, while the lower struts 16 and 20 are hinged at their ends to lower positions of the rotor shaft and the respective blades 22 and 24. Thus, each strut/blade assembly comprises with the rotating shaft a four-bar linkage. The upper strut 14 is connected to the rotor shaft 40 at an upper shaft hinge represented by the circle 42 and to the blade 22 at an upper blade hinge represented by the circle 44. The lower strut 16 is connected to the rotor shaft 40 at a lower shaft hinge represented by the circle 46 and to the blade 22 at a lower blade hinge represented by the circle 48. The hinges 42 and 46 are spaced apart by the distance d, and the hinges 44 and 48 are spaced apart by the distance b. The blade 22 in this embodiment has a length L, as does the blade 24. Both blades are straight, but in other embodiments they can have a different geometry, such as that depicted in FIG. 1A, in which the turbine rotor blades 22a and 24a are curved. Features of the power generating system depicted in FIG. 1A with an added "a" correspond to like numbered features in FIG. 1. The turbine 10a in FIG. 1A is shown upright (β=0° 1 for ease of illustration.

In an operational configuration depicted in FIG. 2, the struts 14 and 16 are rotated from their stowed position (described in more detail in reference U.S. Pat. No. 10,208,734 and below in connection with FIG. 10) to space the blades from the shaft as shown in FIG. 2. The struts have different lengths $L_1$ (strut 16) and $L_2$ (strut 14), which cause the blade 22 to assume an operational position in which it is tilted outwardly at an angle γ with the shaft (see FIG. 1). The projected area of the turbine (A in equation no. 1) is twice the shaded area in FIG. 2. It will be appreciated that A can be changed according to the positions of the struts, in accordance with principles discussed in reference U.S. Pat. No. 10,208,734. This feature can be used to advantage in the present design as described in further detail below.

Figure 3:
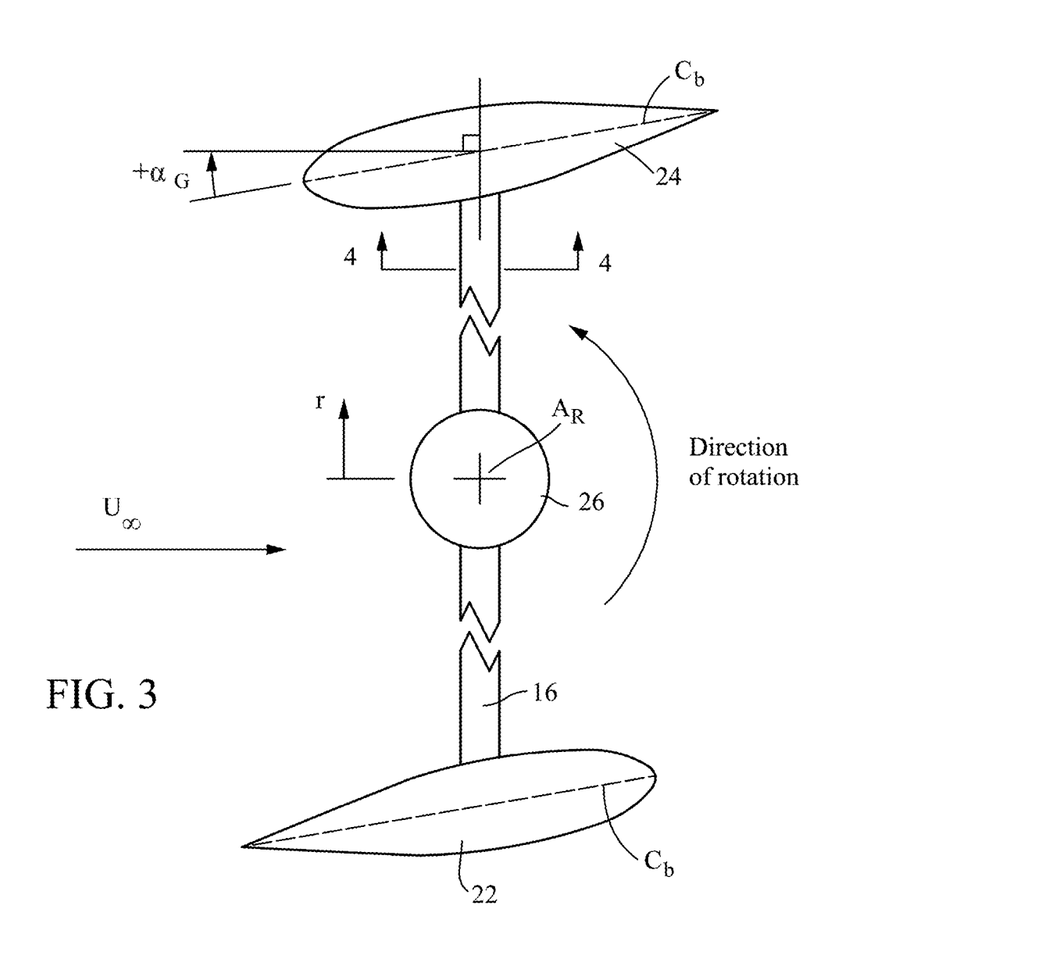
FIG. 3 is a sectional view of the hybrid wind turbine taken along line 3-3 in FIG. 1.
Figure 4:
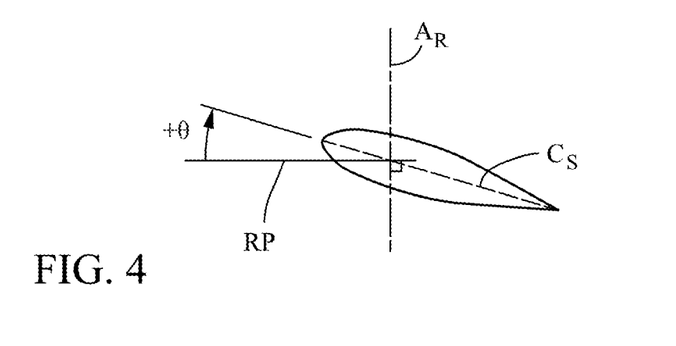
FIG. 4 is a sectional view of a strut of the hybrid wind turbine taken along line 4-4 in FIG. 3.

Another important feature of the turbine rotor 12 is that the struts 14, 16, 18, and 20 comprise airfoil sections, which will be understood with reference to FIGS. 3 and 4. FIG. 3 is a section through the turbine 10 taken at lines 3-3 in FIG. 1. It depicts a rotor constructed in accordance with the principles described in U.S. Pat. No. 10,208,734. That is, the mean chord lines $C_b$ of the blades 22 and 24 have a non-zero geometric angle of attack ac, as shown in the figure. (The parameter as is defined more rigorously in U.S. Pat. No. 10,208,734.) However, it will be appreciated that the design principles according to the present invention are equally applicable to prior art VAWTs in which $α_G$=0.

FIG. 4, which is a cross-section taken along line 4-4 in FIG. 3, depicts the strut 14 or 16 with a strut mean chord line $C_s$ which forms a pitch angle θ with a reference plane RP perpendicular to the turbine axis. (θ is positive in the direction shown in the drawing.) In accordance with the design principles discussed in detail further below, the pitch angle can be constant along the length of the strut, can vary (twist) as a function of the distance from the turbine axis, or can be adjusted during operation. Similarly, the shape of the strut in cross-section and/or the length of its mean chord line C, can be constant along the length of the strut or can vary as a function of the distance from the turbine axis $A_R$. Those skilled in the art will also recognize that there are a variety of ways that the pitch angle can be changed during operation, such as providing a linkage that rotates the strut about an axis extending along the strut.

II. Designing a Floating Hybrid Vertical/Horizontal Axis Wind Turbine

The design methodology described herein can be used to construct a high-performance, floating hybrid wind turbine. One of the unique aspects of the design approach described herein is a relationship defined by various turbine parameters that determines a heel angle β that provides maximum power output for a given turbine construction, which can be used to design a floating hybrid turbine that will assume a heel angle that provides maximum power at a target wind speed, such as a prevailing wind speed at an intended offshore installation site. The same design principles can be used to construct a hybrid wind turbine that generates essentially constant power over a broad range of heel angles.

This design methodology starts with choosing a notional baseline VAWT hybrid wind turbine geometry with blades having particular aerodynamic properties, as if it had no struts. With reference to FIGS. 2 and 3, the baseline VAWT will have geometric dimensions and aerodynamic properties of a VAWT rotor for potential use in the hybrid turbine being designed. The power $P_{V0}$ generated by the baseline VAWT turbine at the design wind speed is calculated using conventional mathematical and numerical modeling techniques such as computational fluid dynamics (CFD) programs, an example being the CHARM computer software for dynamic modeling of fluid flow available from Continuum Dynamics, Inc., of Ewing, N.J.

A similar calculation is done to determine a power $P_{H0}$ for a theoretical baseline HAWT comprising just the struts as if they were rotating about an axis parallel to the wind direction (that is, as an HAWT). In other words, for the turbine shown in FIGS. 1 and 2, each set of struts (such as the struts 14, 18 and struts 16, 20) would be treated as an HAWT rotor, and the two pairs of struts as two HAWT rotors. With reference to FIGS. 3 and 4, these baseline HAWT rotors will have geometric dimensions and aerodynamic properties simulating those of the struts for potential use in the hybrid turbine being designed. The power $P_{H0}$ generated by the baseline strut pairs at the target wind speed is also calculated using conventional mathematical and numerical modeling techniques.

Then, the following algorithm is used to determine the power contributed by the baseline VAWT of a given size:

$$P_V \approx H \times 2 \times R \times \frac{P_{V0}}{A_{V0}} \times \cos\beta \qquad (2)$$

where H is the height of the turbine, and R is the distance to the blades from the turbine axis (that is, the turbine radius), and $A_{V0}$ is the projected area of the baseline VAWT. Likewise, the following algorithm is used to determine the power contributed by struts of a given size:

$$P_H \approx \pi \times R^2 \times \frac{P_{H0}}{A_{H0}} \times \sin\beta \qquad (3)$$

where $A_{H0}$ is the projected area of the baseline HAWT (that is, a rotor comprising the struts).

Accordingly, the total power P for a hybrid vertical/horizontal axis wind turbine can be approximated by adding equations nos. 2 and 3:

$$P \approx H \times 2 \times R \times \frac{P_{V0}}{A_{V0}} \times \cos\beta + \pi \times R^2 \times \frac{P_{H0}}{A_{H0}} \times \sin\beta \qquad (4)$$

The value of β at which P is a maximum can be determined by differentiating equation no. 4 with respect to β, setting the result to zero, and solving for β:

$$\tan\beta = \left(\frac{P_{H0}}{P_{V0}}\right)\left(\frac{A_{V0}}{A_{H0}}\right) \times \frac{\pi}{2} \times \frac{R}{H} \qquad (5)$$

By defining a hybrid scaling factor:

$$\varepsilon = \left(\frac{P_{H0}}{P_{V0}}\right)\left(\frac{A_{V0}}{A_{H0}}\right) \qquad (6)$$

and aspect ratio AR of the hybrid turbine as H/(2R), the following equation provides the heel angle β that provides maximum power for a given hybrid turbine aspect ratio:

$$\tan\beta = \varepsilon \times \frac{\pi}{4AR} \qquad (7)$$

It will be appreciated that aspect ratio in this formulation assumes that the blades 22 and 24 are straight (as noted above) and that R is the radial distance between the axis $A_R$ and the midpoint of the blade from either end. In the general case, H is the length L of the blade along the axis $A_R$ (for example, H=L×cos γ for the turbine in FIGS. 1 and 2), and R is the mean radial distance between the axis and the blades.

A. Interrelationship of ε, β, and AR

Figure 5:
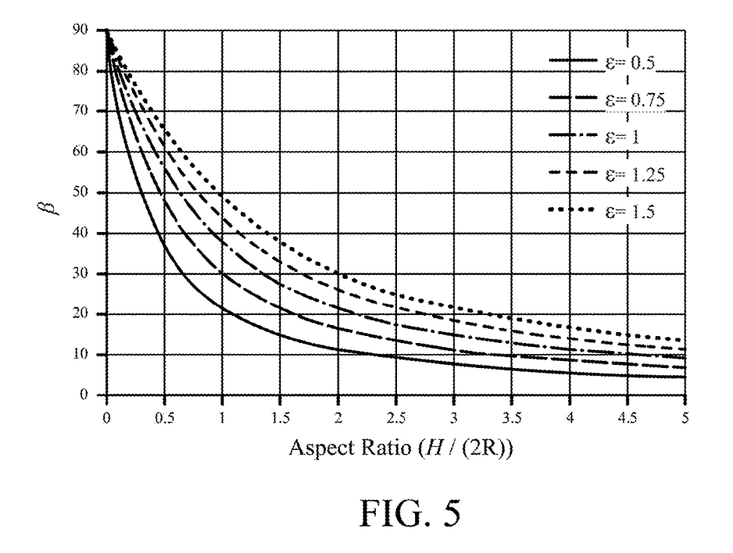
FIG. 5 illustrates how the defined parameters aspect ratio AR and hybrid scaling factor ε together influence the value of the turbine axis heel angle β that will yield the maximum power $P_{max}$ generated by a given hybrid vertical/horizontal axis wind turbine according to an embodiment of the present invention.
Figure 6:
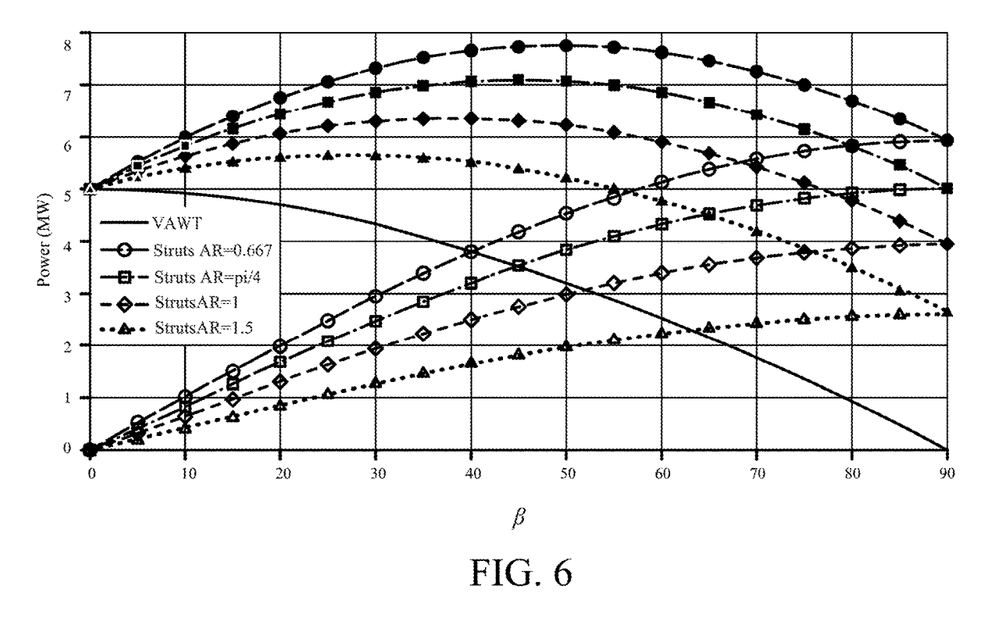
FIG. 6 presents the relationship between ε, β, and AR in a slightly different form, in which ε=1 for all cases and AR varies.

FIG. 5 illustrates how aspect ratio (as defined above) and the parameter ε together influence the value of 0 that will yield the maximum power $P_{max}$ generated by a given hybrid vertical/horizontal axis wind turbine. FIG. 5 illustrates that the value of β increases for a given aspect ratio as ε increases. For example, at AR=2.0, β increases from 10° at ε=0.5 to 30° at ε=1.5. FIG. 6 presents the relationship between e, 3, and aspect ratio in a slightly different form. In FIG. 6, ε=1 for all of the curves. The line labeled "VAWT" illustrates the manner in which the power generated by the VAWT drops as β increases. The calculation of the power contributed by the VAWT at different values of β was performed using a 5 MW VAWT design (at β=0), and uses the same VAWT for all values of β. The VAWT aspect ratio changes while the projected area $A_{V0}$ remains constant (which is why there is only one VAWT curve in FIG. 6). The contribution to total power by the struts was calculated for different aspect ratios (AR), but with the value of E kept constant (=1.0). The curves plotted using "open" symbols represent the contribution to power by the struts from zero at β=0, and increasing as β increases. The curves plotted using "solid" symbols represent the total power for the hybrid turbine. To compare FIG. 5 with FIG. 6, consider that the maximum power for AR=1.5 and ε=1.0 is at about β=26° in both FIGS. 5 and 6.

The relationships expressed by the above equations and illustrated visually in FIGS. 5 and 6 enable a hybrid vertical/horizontal wind turbine to be designed to assume an optimum heel angle β at a given site with known wind conditions. An example of a design methodology to accomplish this begins by making certain assumptions regarding the aerodynamic properties of the blades and struts of a baseline VAWT and HAWT, and using known mathematical and/or numerical modeling techniques to calculate values for $P_{V0}$, $A_{V0}$, $P_{H0}$, and $A_{H0}$, as discussed above. This provides a value for ε (eq. 6). The turbine will also typically have a design power requirement and, in the present example, a specified wind velocity at which the turbine is to operate. The area of the turbine required to generate a given amount of power can be calculated beginning with equation no. 1 above. For purposes of this example, it is assumed that Cp is the so-called Betz limit (16/27), so that the value of A required to generate the target power can be estimated by solving equation no. 1 for A.

At that point, a value of AR can be chosen to provide the heel angle at which maximum power for the thus-designed turbine will be achieved. Typically, however, there are structural considerations that will affect the desirability of a turbine with a particular aspect ratio, such as might be the case for a turbine designed to take advantage of principles described in reference U.S. Pat. No. 10,208,734. If so, one or more iterations on the initial design assumptions can be made using the information in plots such as FIGS. 5 and 6 to make adjustments to the geometry of the turbine and/or the aerodynamic characteristics of the blades and struts to find an optimum operating value for the heel angle β.

It will be appreciated that equation no. 7 is significant for a number of reasons. First, and fundamentally, it demonstrates that an optimum heel angle β does in fact exist that will generate maximum power for any given hybrid wind turbine with the characteristics described above. But beyond that, it also provides a basis for actually designing a hybrid wind turbine that will assume a predetermined heel angle in the presence of a prevailing wind at a predetermined velocity. Armed with these tools, a turbine engineer skilled in the art can design a hybrid turbine to be mounted on a floating platform that will satisfy structural and performance requirements at a predetermined heel angle for a given wind velocity.

B. Examples of Specific Hybrid Turbine Design Methods

A hybrid vertical/horizontal axis wind turbine according to the aspects of the invention described above Involves first determining the environmental conditions at a proposed site and the amount of power to be produced. From the standpoint of the present design, the most important environmental condition is the prevailing wind speed (the direction of the prevailing wind being largely irrelevant). Typically, the turbine will be designed for a given wind speed averaged over a certain amount of time. Often this data is already available for a proposed wind farm site, but it can be developed as part of the overall design effort.

A more rigorous design method than the one presented above uses strip theory, a known technique whereby the aerodynamics of a three-dimensional blade and strut are modeled as flow over series of two-dimensional sections. The following relationship results from using strip theory to derive a unique relationship that can be used to estimate the average power over one rotor revolution (360°) generated the blades and struts of a hybrid vertical/horizontal axis wind turbine as described herein. This relationship is embodied in the following equation:

$$\frac{\overline{P}}{\frac{1}{2}\rho U_\infty^3 (2RL)} = \qquad (8)$$

$$\frac{N}{2\Lambda^3} \frac{c_{blade}}{L} \frac{L}{R} \left\{ \frac{1}{2} \left[ \frac{\partial C_L}{\partial \alpha} - \frac{3}{2}(C_{d0} + C_{d2}\alpha_G^2) - C_{d2} \right] \right\}_{blade} + \frac{M}{2\Lambda^3} \frac{c_{strut}}{R}$$

$$\frac{R}{L} \left\{ \frac{\partial C_L}{\partial \alpha} \left( \frac{1}{3}\theta\Lambda\sin\beta + \frac{1}{2}\Lambda^2\sin^2\beta \right) - C_{d2} \left( \frac{2}{3}\theta\Lambda\sin\beta + \frac{1}{2}\Lambda^2\sin^2\beta \right) - \frac{1}{4}(C_{d0} + C_{d2}\theta^2)(\Lambda^2+1) \right\}_{strut}$$

where "blade" and "strut" indicate the respective contributions of each to the average power $\overline{P}$ (defined below), and the terms used in equation no. 8 are as follows:

$\overline{P}$=power generated by the turbine, averaged over one revolution $\beta$=heel angle $\rho$=density of air $U_\infty$=free stream wind velocity R=the radial distance of the blade from the axis of rotation L=blade length N=number of blades M=number of struts $\Omega$=angular rotation rate of turbine (in rad/sec)

$\Lambda = U_\infty/\Omega L$

For the blades and struts:

c=mean chord length $\partial C_L/\partial \alpha$=slope of lift coefficient curve with respect to local angle of attack $\alpha$ $C_d$=drag coefficient, assumed to have the form $C_d = C_{d0} + C_{d2} \times \alpha^2$, where the coefficients are determined by fitting a curve through experimental data $C_{d0}$=drag coefficient of the airfoil shape at zero angle of attack ($\alpha=0$)

$C_{d2}$=parameter dependent on airfoil shape used to express the sensitivity of drag coefficient to $\alpha^2$ $\alpha_G$=geometric angle of attack of the blades (see FIG. 3)

$\theta$=geometric pitch of the struts, defined as the angle from a conical surface formed by the strut paths about the turbine axis to a mean chord of the strut airfoil (see FIG. 4)

Equation no. 8 is based on a hybrid turbine in which the blades are parallel to the axis of rotation ($A_R$ in FIGS. 1-4) and the struts are perpendicular to the blades and the axis.

In addition, geometric angle of attack of the blades and the pitch of the struts are assumed to be constant along the length L of the blades and length R of the struts. However, the core concepts illustrated by equation no. 8, and the design method based on it, apply to more complex turbine geometries and blade and strut configurations, as well as to turbines in which the blade and strut configurations and aerodynamic characteristics can be varied.

Equation no. 8 can be simplified and rearranged (and by using the trigonometric relationship $\cos^2\beta 1-\sin^2\beta$) to provide the following expression for the normalized average power per revolution:

$$\frac{\overline{P}}{\frac{1}{2}\rho U_\infty^3 (2RL)} = C_0 + C_1 \sin\beta + C_2 \sin^2\beta \qquad (9)$$

Equation no. 9 expresses the average power (normalized with respect to turbine geometry and wind velocity) at a given heel angle $\beta$. The coefficient $C_0$ collects the terms in equation no. 8 not multiplied by either $\sin\beta$ or $\sin^2\beta$; the coefficient $C_1$ collects the terms in equation no. 8 multiplied by $\sin\beta$; and the coefficient $C_2$ collects the terms in equation no. 8 multiplied by $\sin^2\beta$. These coefficients comprise the following terms:

$$C_0 = \frac{N}{2\Lambda^3} \frac{c_{blade}}{L} \frac{L}{R} \qquad (9a)$$
$$\left\{ \frac{1}{2}\left[\frac{\partial C_L}{\partial \alpha} - \frac{3}{2}(C_{d0}+C_{d2}\alpha_G^2) - C_{d2}\right]\Lambda^2 - (C_{d0}+C_{d2}\alpha_G^2)\right\}_{blade} -$$
$$\frac{M}{8\Lambda^3}\frac{c_{strut}}{R}\frac{R}{L}\{(C_{d0}+C_{d2}\theta^2)(\Lambda^2+1)\}_{strut}$$

$$C_1 = \frac{M}{6\Lambda^2}\frac{c_{strut}}{R}\frac{R}{L}\left\{\left(\frac{\partial C_L}{\partial \alpha} - 2C_{d2}\right)\theta\right\}_{strut} \qquad (9b)$$

$$C_2 = -\frac{N}{4\Lambda}\frac{c_{blade}}{L}\frac{L}{R}\left\{\frac{\partial C_L}{\partial \alpha} - \frac{3}{2}(C_{d0}+C_{d2}\alpha_G^2) - C_{d2}\right\}_{blade} + \qquad (9c)$$
$$\frac{M}{4\Lambda}\frac{c_{strut}}{R}\frac{R}{L}\left\{\frac{\partial C_L}{\partial \alpha} - C_{d2}\right\}_{strut}$$

Differentiating equation no. 9 with respect to $\beta$ and setting the result to zero gives the $\beta^*$ that will generate maximum power:

$$(C_1+2C_2 \sin\beta^*)\cos\beta^*=0 \qquad (10)$$

Since $\cos\beta^*=0$ ($\beta=90°$) is not an actual physical solution (it would mean the turbine is lying on its side), equation no. 10 can be solved for a generalized design parameter $\eta$, which is defined as equal to one for maximum average power $\overline{P}$:

$$\eta \triangleq -\frac{2C_2 \sin\beta}{C_1} \qquad (11)$$

Thus, when a hybrid vertical/horizontal axis wind turbine is designed with a predetermined geometry, and blades and struts having predetermined aerodynamic characteristics, such that $\eta=1$, $\beta=\beta^*$, and the turbine will generate maximum power in the presence of a prevailing wind at a predetermined velocity. An additional feature is that at wind speeds above the prevailing design value, increased heel angle above this optimum would tend to maintain the power generated constant to fully utilize the electric generator's rated output.

It will be appreciated that $C_2$ must be negative, which implies that for a positive heel angle (meaning that the turbine heel in the same direction as the prevailing wind), $C_1$ must be positive. If equation no. 11 is solved for $\sin\beta$ and substituted in equation no. 9, an expression for normalized average power p (the left side of equation no. 9) as a function of $\eta$:

$$p(\eta) = C_0 + \frac{C_1^2}{4C_2}(\eta - 2)\eta \qquad (12)$$

For $\beta=0$ (vertical turbine axis), $\eta=0$ (from equation no. 12), and the normalized power=$C_0$. For $\eta=1$, the normalized power is maximized (p*) and has a value:

$$p^* = p(1) = C_0 - \frac{C_1^2}{4C_2} \qquad (13)$$

1. Hybrid Turbine with Optimum Heel Angle

One example of the application of the above design principles to a hybrid turbine as described herein is to determine a heel angle that maximizes power generation for a particular turbine geometry and blade and strut aerodynamics. The turbine geometry will take into account the overall stresses imposed on the structure as described in reference U.S. Pat. No. 10,208,734. A typical design may have three blades (M=3), each being supported by two struts (N=6). Values for $\partial C_L/\partial \alpha$, $C_{d0}$, and $C_{d2}$ above depend on airfoil shape. For convenience, a known airfoil is usually employed because its precise dimensions and contour will be available in the literature. A NACA 0012 or NACA 0015 airfoil is a typical example of an airfoil suitable for the blades of a VAWT, and can also be used for the struts for convenience. These airfoils will yield the following estimated values: $\partial C_L/\partial \alpha = 2\pi$, $C_{d0}=0.005$, and $C_{d2}=0.007/(\pi/18)^2$ (based on curve fits to experimental data). Those skilled in the art will recognize that $2\pi$ will closely approximate $\partial C_L/\partial \alpha$ for airfoils like NACA 0012 or NACA 0015. See Abbott, I. H., and von Doenhoff, A. E. *Theory of Wing Sections: Including a Summary of Airfoil Sections*. Dover, 1959, pp. 321, 324 (available at https://aeroknowledge77.files.wordpress.com/2011/09/58986488-theory-of-wing-sections-including-a-summary-of-airfoil-data.pdf). The mean chord length c for a typical utility-scale VAWT is about 1.5 m, which for convenience can be used as c for the struts as well. For the sake of illustration in this example, $\alpha_G=0$ (although it may have a non-zero value in a hybrid turbine designed in accordance with reference U.S. Pat. No. 10,208,734), and $\theta=0.15$ rad ($\approx 8.6°$).

Figure 7:
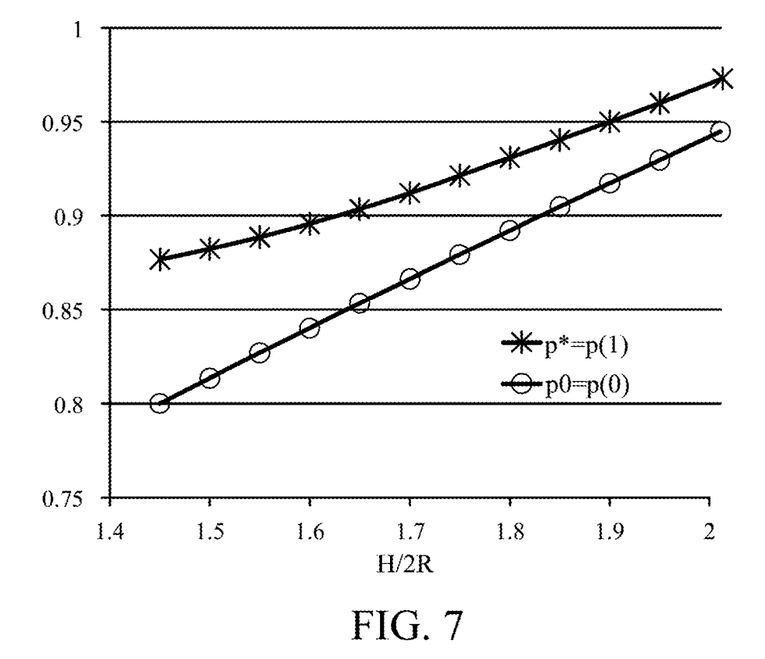
FIG. 7 illustrates the relationship between turbine aspect ratio and the maximum power generated by a representative hybrid wind turbine incorporating principles of the present invention, versus the same relationship for a comparable VAWT.

Assuming $U_\infty/\Omega R=1/5$, equations nos. 12 and 13 can be used to illustrate the increase in power for different aspect ratios (H/2R, which in the present example is the same as L/2R) for the above described hypothetical hybrid turbine design. The aspect ratio is chosen as the determining variable for this illustration in accordance with the principles described above sections II. and II.A. and the preliminary scaling law in equation no. 8. According to equation no. 13, the power for a VAWT when the axis is vertical ($\delta=0$, $\eta=0$) is $C_0$. The maximum average normalized power p* (equation no. 13) is greater at all aspect ratios, as shown in FIG. 7.

Figure 8:
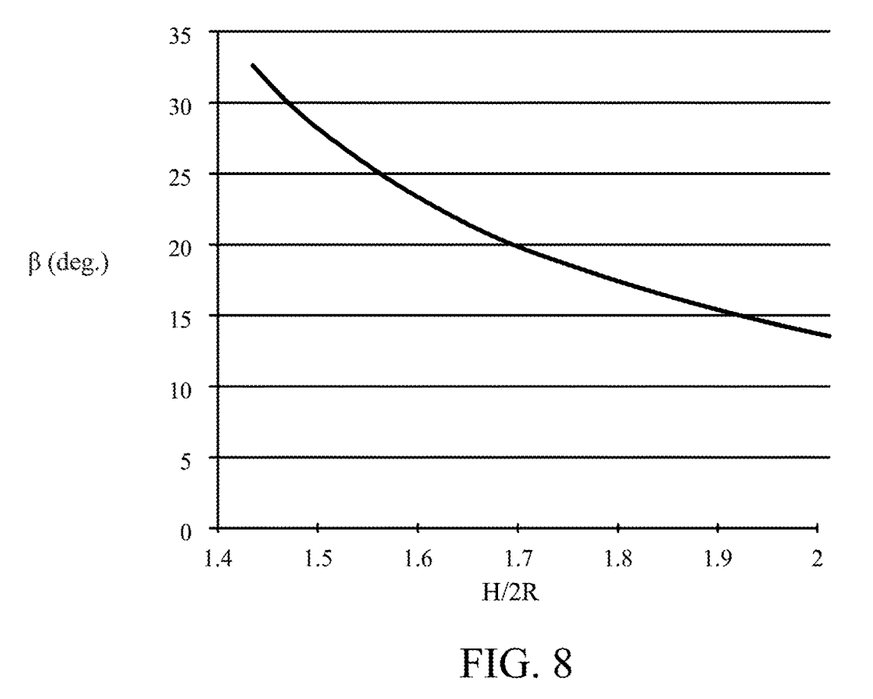
FIG. 8 illustrates the relationship between heel angle β and aspect ratio for the same representative hybrid wind turbine as in FIG. 7.

FIG. 8 illustrates how the hypothetical hybrid turbine with the overall geometry and aerodynamic characteristics is designed for maximum power generation for a given aspect ratio. Generally speaking, the aspect ratio of a wind turbine configured as a VAWT (as defined above) is an important parameter for structural reasons, and also influences the rotational velocity $\Omega$ in the presence of a given prevailing wind velocity $U_\infty$, which largely determines the value of the parameter $\Lambda$. Thus, the plot in FIG. 8 enables a turbine designer to choose the value of $\beta$ that will provide maximum power for a given aspect ratio. Then, for a hybrid turbine with the desired geometry and aerodynamic and structural characteristics, the heel angle can be achieved by selecting a suitable weight and weight distribution in the platform 30 that will cause the turbine to assume the optimum heel angle $\beta$.

It will be understood that the terms "maximum" power and "optimum" heel angle as used herein actually refer to limited ranges of values. Any floating turbine system for which there is an "optimum" heel angle or a "maximum" power will still be within the subject matter claimed herein if it is designed using the principles described herein to generate power at a level that is substantially increased over that possible with a conventional VAWT of comparable geometry. For example, "maximum power" would cover a range up to about ±10% of a theoretical maximum power, minus realistic/actual system losses (for example, losses attributable to generator efficiency) that could be generated by a given system, and "optimum heel angle" would cover a range up to about ±10° of a theoretical optimum value of $\beta$. Using a narrower range, such as ±5%, to define maximum power and optimum heel angle would yield a hybrid turbine with even more superior performance.

Another way of considering what constitutes an optimum heel angle looks at the power coefficient Cp of the hybrid turbine at a particular design heel angle. Using the design principles discussed herein, the system can be configured and the blades and struts can be constructed with aerodynamic characteristics for generating lift forces so that the power coefficient at a design heel angle has a predetermined value that varies less than 0.5% per degree change in heel angle.

2. Minimizing Effect of Heel Angle on Power Generation

Figure 9:
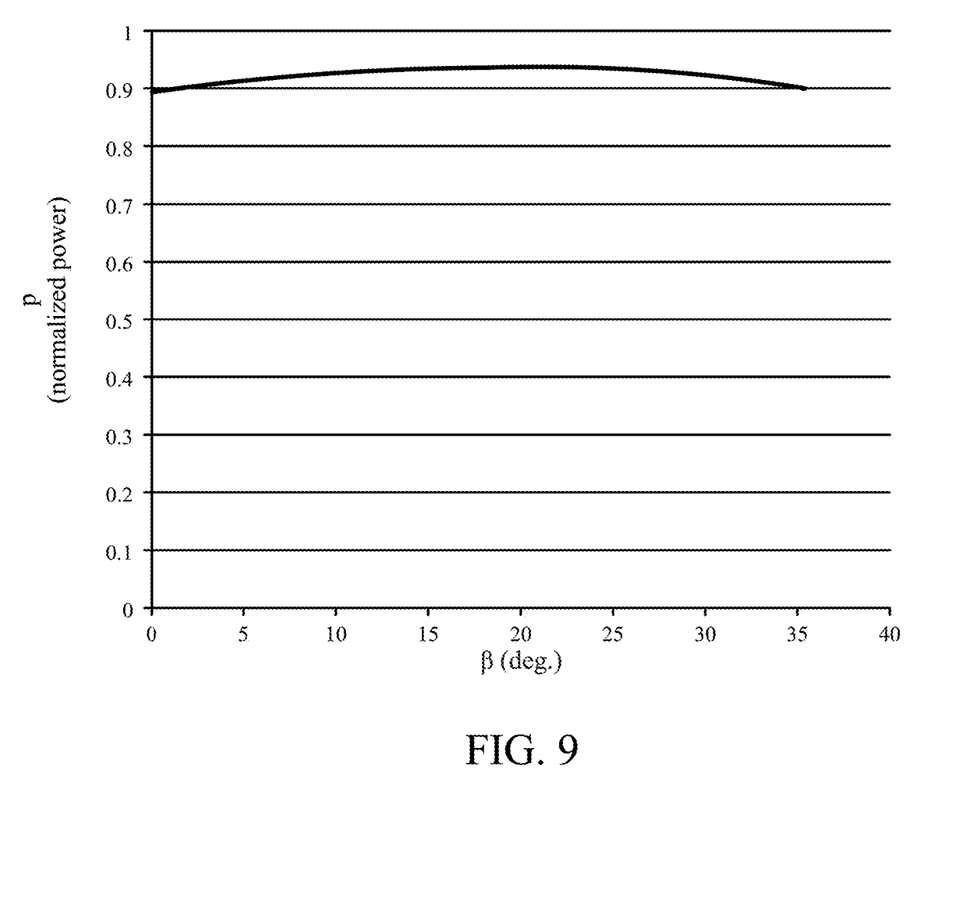
FIG. 9 illustrates another aspect of the invention whereby a hybrid wind turbine can be designed generate to essentially constant power for a broad range of heel angles.

In another application of the principles disclosed herein, a vertical/horizontal axis hybrid wind turbine can be designed such that, at a given wind speed, the generated power has only a weak dependence on the heel angle $\beta$. There will still be a heel angle at which maximum power is generated, but the power only decreases by a small amount as the heel angle varies. This is advantageous for a floating wind turbine whose heel angle is changing due to changing wind speeds. Using the same parameters as the example in section B.1. normalized power p is plotted as a function of tilt angle in FIG. 9 for a turbine with an aspect ratio of H/2R=L/2R=1.8, which is a reasonable value for a VAWT component of a hybrid turbine of the type described herein. FIG. 9 illustrates that the power curve (p vs. $\beta$) is relatively flat, thus indicating that power does not vary significantly with heel angle. One approach to designing a hybrid turbine that is relatively insensitive to heel angle would be to start with the design protocol already descried in this section B. Geometric parameters such as blade length L, strut length R, and the blade and strut chords $c_{blade}$ and $c_{strut}$ are then iterated upon until both a desirable maximum power and insensitivity to heel angle (as defined herein) are attained. In the example plotted in FIG. 9, the aspect ratio of the turbine was varied and the resulting heel angle was calculated.

It will be understood that the terms "essentially the same," "substantially the same," and "does not vary significantly" as applied to this aspect of the hybrid actually refer to ranges of values. Any floating turbine system for which the power generated is described using those or similar terms with respect to a range of heel angles will still be within the subject matter claimed if it is designed using the principles described herein to generate power at a level that is substantially increased over that possible with a conventional VAWT of comparable geometry. For example, this terminology in its various forms would cover a variation up to about ±10% variation in the heel angle in an operating regime of Interest. Using a narrower range, such as ±5%, would yield a hybrid turbine with even more superior performance.

The second advantage of this approach is that for VAWT designs meeting certain geometric, aerodynamic and operating requirements an optimum heel angle that maximizes generated power can also be found. While these requirements can be complex, an example of one such requirement is inferred from the simple analysis above and the observation that existence of a maximum requires $C_2<0$. From equation no. 9c:

$$4\Lambda C_2 = -N\frac{c_{blade}}{L}\frac{L}{R}\left\{\frac{\partial C_L}{\partial \alpha} - C_{d2} - \frac{3}{2}(C_{d0} + C_{d2}\alpha_G^2)\right\}_{blade} + \quad (14)$$

$$M\frac{c_{strut}}{R}\frac{R}{L}\left\{\frac{\partial C_L}{\partial \alpha} - C_{d2}\right\}_{strut}$$

Enforcing $C_2<0$ and rearranging terms in equation no. 14 to solve for the blade and strut areas:

$$\frac{N}{M}\frac{c_{blade}}{c_{strut}}\frac{L}{R} > \frac{\left\{\frac{\partial C_L}{\partial \alpha} - C_{d2}\right\}_{strut}}{\left\{\frac{\partial C_L}{\partial \alpha} - C_{d2} - \frac{3}{2}(C_{d0} + C_{d2}\alpha_G^2)\right\}_{blade}} \approx 1 \quad (15)$$

Equation no. 15 can be interpreted as requiring that the total planform area of the blades ($=N \times c_{blade} \times L$) exceed that of the struts ($=M \times c_{strut} \times R$) for $C_2<0$. Thus, if this constraint is imposed on the hybrid wind turbine design parameters, then from equation no. 11 it will be known that a power maximizing heel angle does exist. The heel angle itself is found by solving equation no. 11.

C. Summary of Design Methods

The above described methods for achieving predetermined performance goals in a hybrid vertical/horizontal turbine can be adapted for designing a hybrid turbine with blades and struts having more complex aerodynamic properties, such as tilted blades and cambered blades (per reference U.S. Pat. No. 10,208,734), cambered struts, and blades and/or struts with variable twist, variable mean chord length, etc. While not wishing to be limited to any particular way of taking such properties into account, one approach could consider the lift generated by the blades and struts as functions of the angular position of the turbine shaft and the heel angle. This could be accomplished using well known mathematical and numerical modelling as well as CFD programs. The average power for complete revolution (equation no. 8) can then be obtained by integrating over one revolution (360°) of the shaft. The analysis can be refined further by using more sophisticated aerodynamics models that account for inflow, momentum deficit, stall, wake distortion, compressibility and viscous effects. These would include, but not necessarily be limited to) lifting lines, vortex lattice methods, panel or boundary element methods, or CFD techniques to solve the potential flow, Euler, or Navier-Stokes equations. These types of models would involve tradeoffs in flow modeling fidelity and computational cost, and a typical approach would use increasingly sophisticated (and computationally expensive) analyses as a particular design is refined.

When using numerical methods to calculate averaged loads and power, or incorporating more advanced aerodynamics models, explicit expressions for the optimum heel angle β* are often not available. Instead, this angle is determined numerically using iteration. There are many methods for performing such optimization. One option is to compute the average power for a sequence of heel angles (for example in the range 0°<β<45°), which permits a determination to be made of the heel angle that produces the highest power. Similar techniques can be used to also optimize rotation rate, geometry, material and airfoil characteristics, while ensuring that desirable constraints are met such as staying within maximum and fatigue stress limits, limiting displacements, operating away from stall, etc.

III. Varying the Heel Angle β for Different Environmental Conditions

Another versatile feature of an embodiment represented by the hybrid vertical/horizontal axis wind turbine shown in FIGS. 1 and 2 is that its geometry can be varied to adjust the heel angle β for varying environmental conditions, such as seasonal wind speed fluctuations and changes in sea state (wave height and periodicity, for example). This can be done in a variety of ways, some of which will be described in detail.

A. Changing the Turbine Geometry

As mentioned above, the hybrid vertical/horizontal axis wind turbine 10 includes a mechanism for varying its geometry in the fashion described in U.S. Pat. No. 10,208,734. This is depicted in FIG. 10, which shows an actuator represented schematically by the numeral 100 in FIG. 2. The actuator is shown with a hydraulic cylinder 102 that moves a piston 104 linearly in the directions indicated by the arrows adjacent to the piston in FIG. 2. The base of the cylinder 102 is connected at a hinge 106 to a slider 108 that moves vertically on the shaft 40. The distal end of the piston 104 is connected at a hinge 110 to the lower strut 16. As the actuator piston 104 moves in and out of the cylinder, the slider moves to raise and lower the blade 22. FIG. 10 shows the blade 22 in a stowed position discussed in further detail below. With the four-bar linkage arrangement of the present embodiment, the motion of the lower strut 16 ensures that the blades 22 and 24 move simultaneously upward and that all of the struts rotate upward from the positions shown in FIG. 10.

Not only can the actuator be used to place the turbine in a stowed configuration during high winds and other heavy weather, but it can be used to change the geometry of the turbine in accordance with the design principles discussed above to change the turbine aspect ratio and projected area as an aid to maximizing power generation in different environmental conditions.

B. Adjusting Platform Ballast

The infrastructure of the platform 30 and the compartment 32 housing the electrical generator and associated machinery disposed below the waterline WL will inherently act as ballast to stabilize the free-floating system depicted in FIG. 1. The system is designed to assume a target heel angle, per the above discussion, and the weight distribution of the entire system is taken into account in determining the heel angle at which the turbine axis will operate under nominal conditions. However, in some installations the heel angle can be changed to account for different environmental conditions (due to factors such as seasonal variations in wind speed and/or sea state).

Changing the center of gravity of the system, preferably of the platform and its associated structure, will enable the heel angle to be changed to account for different conditions. For example, adjusting the platform ballast can be used to raise or lower the center of gravity (CG) of the floating platform 30 in FIG. 1. Lowering the compartment 32, or adding mass below an existing CG would increase the righting moment on the platform and decrease the heel angle β. Conversely, raising the CG would make the platform less stable and increase the heel angle β. Means for changing the center of gravity could include ballast tanks in which water can be displaced by air (or vice versa) or machinery for raising and lowering the compartment on tracks provided for the purpose.

17

C. Adjusting Mooring Cable Length

The heel angle β can also be changed by increasing or decreasing the length of the mooring cables 38 (FIG. 1). For example, if the turbine is heeled at angle away from the wind, as in FIG. 1, decreasing the length of an upwind cable or cables (to the left in FIG. 1) while increasing the length of a downwind cable or cables will decrease β. Those skilled in the art will recognize that this can be done in a variety of ways, such as by a winch or windlass carried by the platform

D. Adjusting Platform Counterbalance

The heel angle can also be changed by moving a counterbalance in the upwind (windward) direction so as to provide a righting moment on the platform and reduce the heel angle β. Conversely, moving the counterbalance downwind would increase β. Again, those skilled in the art will recognize that this can be in a number of different ways, such as having an arm extending from the platform with a weight the position of which can be moved to change the center of gravity of the system.

IV. Summary and Conclusion

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A method of designing a wind-driven power generating system comprising (i) a hybrid wind turbine having a turbine rotor rotatable about a turbine axis, the turbine rotor including a plurality of rotor members spaced circumferentially around a turbine shaft with at least a portion of each rotor member being spaced radially from the turbine shaft to provide a lift-generating rotor blade, and (ii) a floating platform for supporting the hybrid wind turbine on a body of water for permitting the turbine shaft to freely assume an operating heel angle β relative to vertical in the presence of a prevailing wind, the method comprising:
   setting a target velocity of the prevailing wind;
   designing the rotor blades to have a predetermined configurations and aerodynamic characteristics for producing on the rotor blades a lift force having a component in the direction of rotation of the rotor blades at a designated non-zero value of β in the presence of the prevailing wind at the target velocity;
   determining a quantitative relationship between the geometry of the system and the value of β; and
   using the quantitative relationship between the geometry of the system and the value of β to configure the system so that the turbine shaft heels at the designated non-zero value of β in the presence of the prevailing wind at the target velocity.

2. The method of designing a wind-driven power generating system described in claim 1, further comprising designing said rotor blades with configurations and aerodynamic characteristics that cause the system in the presence of the prevailing wind at the target velocity to generate more electrical power when the turbine shaft heels at the designated non-zero value of β in the presence of the prevailing wind at the target velocity than when β=0.

3. The method of designing a wind-driven power generating system described in claim 1, wherein the system further includes means for changing the designated non-zero value of β when the prevailing wind has a velocity different from the target velocity.

4. The method of designing a wind-driven power generating system described in claim 3, wherein the means for changing the designated non-zero value of β comprises an actuator for changing a projected area of the turbine rotor defined as the area bounded by the rotor blades over one revolution of the turbine shaft when viewed from the direction of the prevailing wind.

5. The method of designing a wind-driven power generating system described in claim 1, wherein each rotor member includes at least two mounting portions mounting an associated rotor blade to the turbine shaft, each said mounting portion having a predetermined configuration and aerodynamic characteristics for producing on said mounting portion a lift force having a lift force component in the direction traveled by said mounting portion as the rotor blades rotate about the turbine axis at the designated non-zero value of β in the presence of the prevailing wind at the target velocity.

6. The method of designing a wind-driven power generating system described in claim 5, wherein each rotor blade is pivotally connected to the associated said mounting portions by hinges.

7. The method of designing a wind-driven power generating system described in claim 6, wherein the rotor blades and the mounting portions are straight and rigid and the mounting portions are attached to the turbine shaft by hinges.

8. The method of designing a wind-driven power generating system described in claim 1, wherein the rotor blades are curved with a central portion of the rotor blades spaced further radially from the turbine shaft than upper and lower portions of the rotor blades.

9. A method of generating electrical power using a wind-driven power generating system comprising a hybrid wind turbine having a turbine rotor rotatable about a turbine axis, the turbine rotor including a plurality of rotor members spaced circumferentially around a turbine shaft with at least a portion of each rotor member being spaced radially from the turbine shaft to provide a lift-generating rotor blade, wherein:
   the hybrid wind turbine is mounted on a floating platform supporting the hybrid wind turbine at a predetermined location on a body of water for permitting the turbine shaft to freely assume an operating heel angle β relative to vertical in the presence of a prevailing wind,
   the rotor blades have a predetermined configurations and aerodynamic characteristics for producing on the rotor blades a lift force having a component in the direction of rotation of the rotor blades at a designated non-zero value of p in the presence of the prevailing wind at a target velocity, and
   the system is configured by determining a quantitative relationship between the geometry of the system and the value of β so that the turbine shaft will heel at the designated non-zero value of β in the presence of the prevailing wind at the target velocity,
   the method comprising:
   determining the target velocity of the prevailing wind based on historical environmental data at the predetermined location; and
   deploying the system on the body of water at the predetermined location.

10. The method of generating electrical power described in claim 9, further comprising configuring the system and designing said rotor blades with aerodynamic characteristics so that in the presence of the prevailing wind at the target velocity the system generates more electrical power at the designated non-zero value of β than at heel angles greater than or less than said value.

11. The method of generating electrical power described in claim 9, further comprising altering the geometry of the system to change the designated non-zero value of β when the prevailing wind has a velocity different from the target velocity.

12. The method of generating electrical power described in claim 11, further comprising changing the designated non-zero value of β by altering the floating platform to change the distribution of weight in the floating platform.

13. The method of generating electrical power described in claim 11, further comprising changing the designated non-zero value of β by altering the geometry of the turbine rotor.

14. The method of generating electrical power described in claim 9, further comprising changing a projected area of the turbine rotor defined as the area bounded by the rotor blades over one revolution of the turbine shaft when viewed from the direction of the prevailing wind.

15. The method of generating electrical power described in claim 14, wherein the projected area of the turbine rotor is changed by changing the radial distance between the rotor blades and the turbine shaft.

16. The method of generating electrical power described in claim 14, further comprising changing the projected area of the turbine rotor to generate substantially the same amount of electrical power at different velocities of the prevailing wind.

17. The method of generating electrical power described in claim 9, wherein each rotor member includes at least two mounting portions mounting an associated rotor blade to the turbine shaft, each said mounting portion having a predetermined configuration and aerodynamic characteristics for producing on said mounting portion a lift force having a lift force component in the direction traveled by said mounting portion as the rotor blades rotate about the turbine axis at the designated non-zero value of β in the presence of the prevailing wind at the target velocity.

18. The method of generating electrical power described in claim 17, wherein each rotor blade is pivotally connected to the associated said mounting portions by hinges.

19. The method of generating electrical power described in claim 18, wherein the rotor blades and the mounting portions are straight and rigid and the mounting portions are attached to the turbine shaft by hinges.

20. The method of generating electrical power described in claim 9, further comprising moving the rotor blades to a stowed position with the rotor blades proximate to the turbine shaft for protection in the presence of excessive prevailing winds.

21. The method of generating electrical power described in claim 9, wherein the rotor blades are curved with a central portion of the rotor blades spaced further radially from the turbine shaft than upper and lower portions of the rotor blades.

* * * * *

UNITED STATES PATENT AND TRADEMARK OFFICE
CERTIFICATE OF CORRECTION

| | |
|---|---|
| PATENT NO. | : 10,927,817 B1 |
| APPLICATION NO. | : 17/067692 |
| DATED | : February 23, 2021 |
| INVENTOR(S) | : Glen R. Whitehouse et al. |

It is certified that error appears in the above-identified patent and that said Letters Patent is hereby corrected as shown below:

In the Claims

Column 18, Line 53, should read:
--value of $\beta$ in the presence of the prevailing wind at a--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*